United States Patent
Niu et al.

(10) Patent No.: US 9,405,969 B2
(45) Date of Patent: Aug. 2, 2016

(54) FACE RECOGNITION METHOD AND DEVICE

(71) Applicant: Huawei Technologies Co., Ltd., Shenzhen, Guangdong (CN)

(72) Inventors: Shengshi Niu, Hangzhou (CN); Shiguang Shan, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 14/444,611

(22) Filed: Jul. 28, 2014

(65) Prior Publication Data

US 2014/0334736 A1  Nov. 13, 2014

Related U.S. Application Data

(63) Continuation of application No. PCT/CN2013/084159, filed on Sep. 25, 2013.

(30) Foreign Application Priority Data

Mar. 19, 2013 (CN) .......................... 2013 1 0088469

(51) Int. Cl.
*G06K 9/00* (2006.01)
*G06K 9/62* (2006.01)
(Continued)

(52) U.S. Cl.
CPC ........ *G06K 9/00295* (2013.01); *G06K 9/00281* (2013.01); *G06K 9/4642* (2013.01); *G06K 9/6202* (2013.01); *G06K 9/6857* (2013.01); *G06K 2009/4666* (2013.01)

(58) Field of Classification Search
None
See application file for complete search history.

(56) References Cited

U.S. PATENT DOCUMENTS

2002/0076088 A1  6/2002  Tsai
2009/0141947 A1*  6/2009  Kyyko ............... G06K 9/00208
                                                    382/118

(Continued)

FOREIGN PATENT DOCUMENTS

CN      1975759 A      6/2007
CN    101079104 A    11/2007

(Continued)

OTHER PUBLICATIONS

Timo Ahonen, et al., "Face Recognition with Local Binary Patterns", ECCV 2004, p. 469-481.

(Continued)

*Primary Examiner* — Siamak Harandi

(57) ABSTRACT

The present invention provides a face recognition method and device. The method includes: performing down-sampling of different sizes on an original face image; performing block partition processing on a down-sampled image and the original face image; extracting feature of each image block; performing similarity matching between the extracted feature of each image block and features of image blocks corresponding to a pre-registered face image to obtain a similarity of each image block; and obtaining a face image recognition result according to an obtained similarity between all the image blocks. According to the face recognition method and device, down-sampling of different sizes is performed on an original face image, which increases a capability of face image features to describe the face image; a face image recognition result is obtained according to a similarity between all the obtained image blocks, which increases an accuracy of face image recognition.

10 Claims, 3 Drawing Sheets

(51) Int. Cl.
    *G06K 9/68*     (2006.01)
    *G06K 9/46*     (2006.01)

(56) References Cited

U.S. PATENT DOCUMENTS

| | | |
|---|---|---|
| 2010/0202703 A1 | 8/2010 | Jeon et al. |
| 2012/0087552 A1 | 4/2012 | Lee |
| 2012/0213419 A1 | 8/2012 | Kim et al. |

FOREIGN PATENT DOCUMENTS

| | | |
|---|---|---|
| CN | 102136062 A | 7/2011 |
| CN | 102163283 A | 8/2011 |
| CN | 102799870 A | 11/2012 |
| CN | 103150561 A | 6/2013 |
| JP | 2000099722 A | 4/2000 |
| JP | 201284112 A | 4/2012 |
| KR | 1020100090829 A | 8/2010 |
| KR | 1020100102949 A | 9/2010 |

OTHER PUBLICATIONS

Xiao Xiao, "The Research and Application of Image Feature Extraction Based LBP Methodology", Sep. 15, 2011, 18 pages.

* cited by examiner

FACE RECOGNITION METHOD AND DEVICE

CROSS-REFERENCE TO RELATED APPLICATION

This application is a continuation of International Application No. PCT/CN2013/084159, filed on Sep. 25, 2013, which claims priority to Chinese Patent Application No. 201310088469.0, filed on Mar. 19, 2013, both of which are hereby incorporated by reference in their entireties.

TECHNICAL FIELD

The present invention relates to the field of information technologies, and in particular, to a face recognition method and device.

BACKGROUND

Nowadays, with the rapid development of electronic information technologies, fields like electronic commerce, online banking, and public security have proposed new requirements on reliability and manners of identity authentication. Biological features are inherent attributes of a person, and have a powerful stability and individual difference. Therefore, performing identity authentication by using the biological features has attracted more and more attention. Performing identity authentication by using face features is the most natural and the most direct way. Therefore, it has an important application value to carry a deep research into the face recognition technology. Feature extraction is a core issue of the face recognition technology, and is directly related to a final accuracy of face recognition.

In the prior art, in a face image to be recognized, several neighborhood pixels are selected around each pixel; a gray value of a center pixel is used as a reference; adjacent pixels with gray values less than a gray value of an intermediate pixel are quantized to 0, and adjacent pixels with gray values greater than or equal to the gray value of the intermediate pixel are quantized to 1. Then, quantized values of the neighborhood pixels are connected in serial according to a specific direction to obtain a binary number; the binary number is further converted into a decimal number; and the decimal number is assigned to the center pixel. The foregoing operations are performed on all pixels in the image in sequence to obtain a local binary pattern (Local Binary Pattern, LBP for short) histogram of the image to be recognized. A feature vector of the LBP histogram of the image to be recognized is compared with a feature vector of an LBP histogram of a pre-registered face image. Then, the face recognition is completed.

However, this face recognition method has a low recognition accuracy.

SUMMARY

The present invention provides a face recognition method and device, which are used to solve a problem in the prior art that an accuracy of face image recognition is low.

According to a first aspect, the present invention provides a face recognition method, including:

obtaining an original face image to be recognized;

performing down-sampling on the original face image to obtain at least one down-sampled image whose size is different from a size of the original face image;

performing block partition processing on each down-sampled image and the original face image to obtain at least two image blocks on which block partition processing is performed;

extracting features of the image blocks on which block partition processing is performed to obtain features of the image blocks;

performing similarity matching between the feature of each image block and features of image blocks corresponding to a pre-registered face image to obtain a similarity of each image block; and obtaining a face image recognition result according to an obtained similarity between all the image blocks.

In a first possible implementation manner of the first aspect, the performing down-sampling on the original face image to obtain at least one down-sampled image whose size is different from a size of the original face image includes:

performing down-sampling on the original face image n times to obtain n down-sampled images of different sizes, where the sizes of the n down-sampled images of different sizes are $¼^m$ of the size of the original face image respectively; n is a natural number and m is a natural number less than n+1.

With reference to the first possible implementation manner of the first aspect, in a second possible implementation manner, the performing block partition processing on each down-sampled image and the original face image includes:

performing block partition processing on each down-sampled image and the original face image according to $1/(S \times 4^n)$ of the size of the original face image, where S is a natural number.

With reference to the second possible implementation manner of the first aspect, in a third possible implementation manner, S is equal to 1 and n is equal to 2.

With reference to the first possible implementation manner, the second possible implementation manner, and the third possible implementation manner of the first aspect, in a fourth possible implementation manner, the extracting features of the image blocks on which block partition processing is performed to obtain features of the image blocks includes:

performing local binary pattern LBP descriptor extraction on each image block on which block partition processing is performed to obtain an LBP histogram of each image block; and extracting, according to the LBP histogram of each image block, a feature vector of each image block on which block partition processing is performed.

With reference to the first possible implementation manner, the second possible implementation manner, the third possible implementation manner, and the fourth possible implementation manner of the first aspect, in a fifth possible implementation manner, before the performing down-sampling on the original face image, the method further includes:

performing histogram equalization pre-processing on the original face image.

According to a second aspect, the present invention provides a face recognition device, including:

an obtaining module, configured to obtain an original face image to be recognized;

a sampling module, configured to perform down-sampling on the original face image to obtain at least one down-sampled image whose size is different from a size of the original face image;

a processing module, configured to perform block partition processing on each down-sampled image and the original face image to obtain at least two image blocks on which block partition processing is performed;

an extracting module, configured to extract features of the image blocks on which block partition processing is performed to obtain features of the image blocks;

a matching module, configured to perform similarity matching between the feature of each image block and features of image blocks corresponding to a pre-registered face image to obtain a similarity of each image block; and a recognizing module, configured to obtain a face image recognition result according to an obtained similarity between all the image blocks.

In a first possible implementation manner of the second aspect, the sampling module is specifically configured to:

performing down-sampling on the original face image n times to obtain n down-sampled images of different sizes, where the sizes of the n down-sampled images of different sizes are $1/4^m$ of the size of the original face image respectively; n is a natural number and m is a natural number less than n+1.

With reference to the first possible implementation manner of the second aspect, in a second possible implementation manner, the processing module is specifically configured to:

perform block partition processing on each down-sampled image and the original face image according to $1/(S \times 4^n)$ of the size of the original face image, where S is a natural number.

With reference to the second possible implementation manner of the second aspect, in a third possible implementation manner, S is equal to 1 and n is equal to 2.

With reference to the first possible implementation manner, the second possible implementation manner, and the third possible implementation manner of the second aspect, in a fourth possible implementation manner, the extracting module is specifically configured to:

perform local binary pattern LBP descriptor extraction on each image block on which block partition processing is performed to obtain an LBP histogram of each image block; and extract, according to the LBP histogram of each image block, a feature vector of each image block on which block partition processing is performed.

With reference to the first possible implementation manner, the second possible implementation manner, the third possible implementation manner, and the fourth possible implementation manner of the second aspect, in a fifth possible implementation manner, the sampling module is further configured to:

perform histogram equalization processing on the original face image before performing down-sampling on the original face image.

According to a third aspect, the present invention provides a face recognition device, including a memory and a processor, where the memory is configured to store an execution instruction; when the face recognition device runs, the processor communicates with the memory, and the processor executes the execution instruction to enable the face recognition device to execute the method according to the foregoing first aspect.

According to the face recognition method and device provided in the present invention, down-sampling is performed on an original face image to be recognized to obtain a down-sampled image whose size is different from a size of the original face image; features of face images of multiple sizes are extracted, which increases a capability of the face image features to describe the face image; block partition processing is performed on the down-sampled image and the original face image, and a face image recognition result is obtained according to a similarity between all the image blocks obtained after block partition processing is performed, which increases an accuracy of face image recognition.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more clear, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
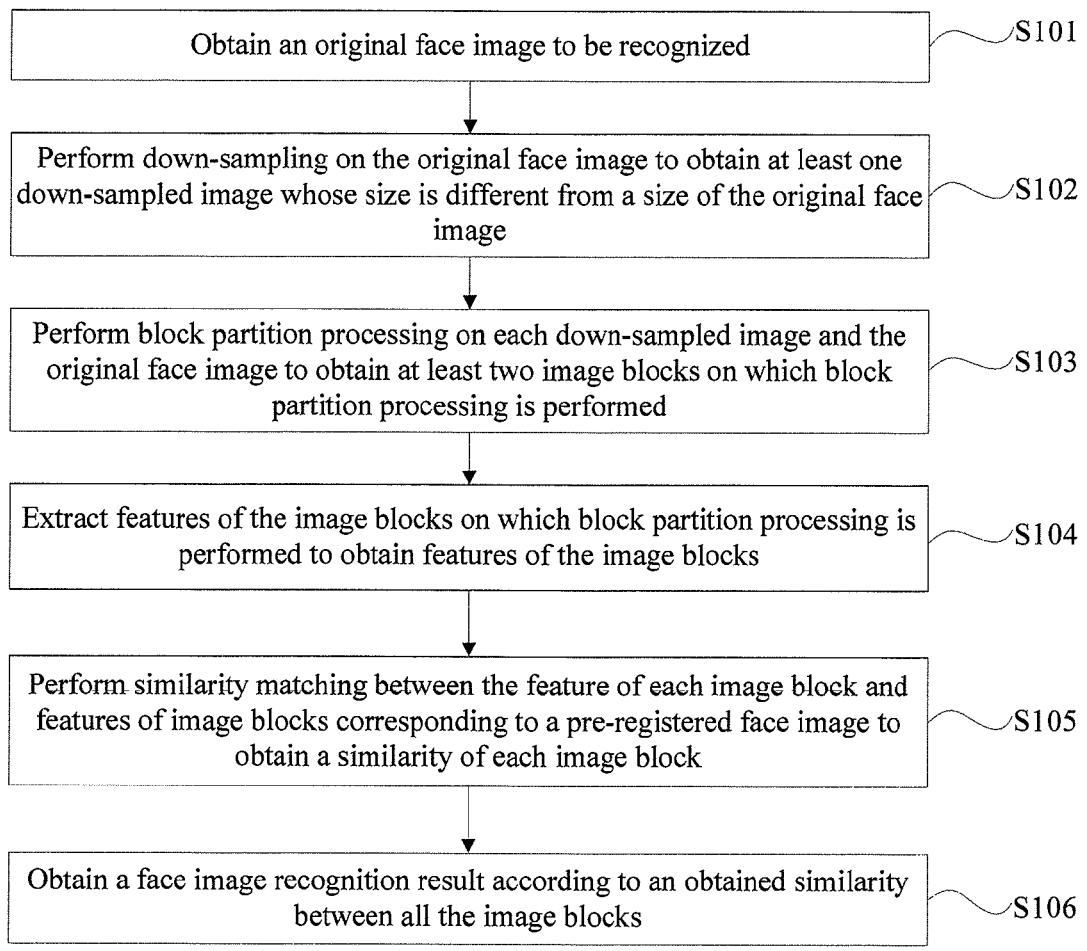
FIG. 1 is a flowchart of an embodiment of a face recognition method according to the present invention.

FIG. 1 is a flowchart of an embodiment of a face recognition method according to the present invention. As shown in FIG. 1, all steps in the following method embodiment may be specifically executed by various devices with a face recognition function, for example, a mobile phone, a personal computer, a PAD, an access control device, and the like. The method may include:

S101. Obtain an original face image to be recognized.

S102. Perform down-sampling on the original face image to obtain at least one down-sampled image whose size is different from a size of the original face image.

Specifically, down-sampling may be performed on the original face image one or more times, and one down-sampled image whose size is different from the size of the original face image may be obtained each time when the down-sampling is performed. The size of a down-sampled image obtained after down-sampling is performed may be 1/n of the original face image, where n may be a natural number.

For example, if the original image is a rectangle or a square, 2×2 down-sampling and 4×4 down-sampling may be performed on the original face image respectively, where the 2×2 down-sampling means that a length of the down-sampled image obtained after down-sampling is performed is ½ of a length of the original face image and a width of the down-sampled image is ½ of a width of the original face image; the 4×4 down-sampling means that the length of the down-sampled image obtained after down-sampling is performed is ¼ of the length of the original face image and the width of the down-sampled image is ¼ of the width of the original face image.

S103. Perform block partition processing on each down-sampled image and the original face image to obtain at least two image blocks on which block partition processing is performed.

Specifically, any image of the original face image and the down-sampled image may be used as a primitive block to perform block partition processing.

For example, in the example described in S102, the original face image is a rectangle or a square, and 2×2 down-sampling and 4×4 down-sampling are performed on the original face image respectively to obtain down-sampled images whose sizes are ¼ and 1/16 of the size of the original face image. In this case, a down-sampled image whose size is 1/16 of the size of the original face image is used as a primitive block to perform block partition processing. In this way, the original face image may be partitioned into 16 image blocks; a down-sampled image whose size is ¼ of the size of the original face image may be partitioned into four image blocks, while the down-sampled image whose size is 1/16 of the size of the original face image is an image block itself and does not need to further perform block partition.

Certainly, an image block of another size may also be used as a primitive block. For example, in the example described in S102, an image block whose size is ½ of the down-sampled image whose size is 1/16 of the original face image may be used as a primitive block. In this way, the original face image may be partitioned into 32 image blocks; the down-sampled image whose size is ¼ of the size of the original face image may be partitioned into eight image blocks, while the down-sampled image whose size is 1/16 of the size of the original face image is partitioned into two image blocks.

In other words, there are multiple methods for performing block partition on the down-sampled image and the original face image, which are not listed one by one herein.

S104. Extract features of the image blocks on which block partition processing is performed to obtain features of the image blocks.

In this step, various existing methods may be used to extract a feature of each image block obtained after block partition processing is performed. For example, a local binary pattern LBP descriptor extraction method may be used to obtain an LBP histogram of each image block. Further, a feature vector of each image block may be extracted according to the LBP histogram of each image block.

S105. Perform similarity matching between the feature of each image block and features of image blocks corresponding to a pre-registered face image to obtain a similarity of each image block.

Specifically, the pre-registered face image is also obtained and stored according to the foregoing steps. In the example described in S102, the original face image is partitioned into 16 image blocks, and images obtained after down-sampling is performed twice are partitioned into four image blocks and one image block respectively. In this case, the pre-registered face image also corresponds to 21 image blocks, and each image block corresponds to a group of feature vectors.

A similarity between feature vectors of the 21 image blocks of the face image to be recognized obtained in step S104 and the feature vectors of the image blocks corresponding to the pre-registered face image may be matched to obtain the similarity of each image block in the face image to be recognized.

S106. Obtain a face image recognition result according to an obtained similarity between all the image blocks.

In this step, a weighted fusion computation may be performed on the obtained similarity between all the image blocks to obtain a final similarity, and the face image recognition result is obtained according to the final similarity. Specifically, weighted fusion is performed on the similarity of each image block in the face image to be recognized obtained in step S105, that is, a weight is allocated to each image block, products of the similarity of each image block and the corresponding weight are added to obtain a final similarity between the face image to be recognized and the pre-registered face image. The allocating a weight may be specifically allocating a larger weight to an image block where a key face part (for example, eye, nose, mouth, or the like) is located and allocating a smaller weight to an image block where a non-key face part (for example, cheek or the like) is located, and a sum of weights corresponding to all the image blocks is 1.

It may be determined according to whether the obtained final similarity exceeds a preset threshold whether the face image to be recognized and the pre-registered face image correspond to a same person, so as to implement recognition of the identity of the person.

It should be noted that the face recognition method provided in this embodiment is also applicable to recognition of images based on other biological features (for example, fingerprint, iris, palm print, and the like).

According to the face recognition method provided in this embodiment, down-sampling is performed on an original face image to be recognized to obtain a down-sampled image whose size is different from a size of the original face image; features of face images of multiple sizes are extracted, which increases a capability of the face image features to describe the face image; block partition processing is performed on the down-sampled image and the original face image, and a face image recognition result is obtained according to a similarity between all the image blocks obtained after block partition processing is performed, which increases an accuracy of face image recognition.

Figure 2:
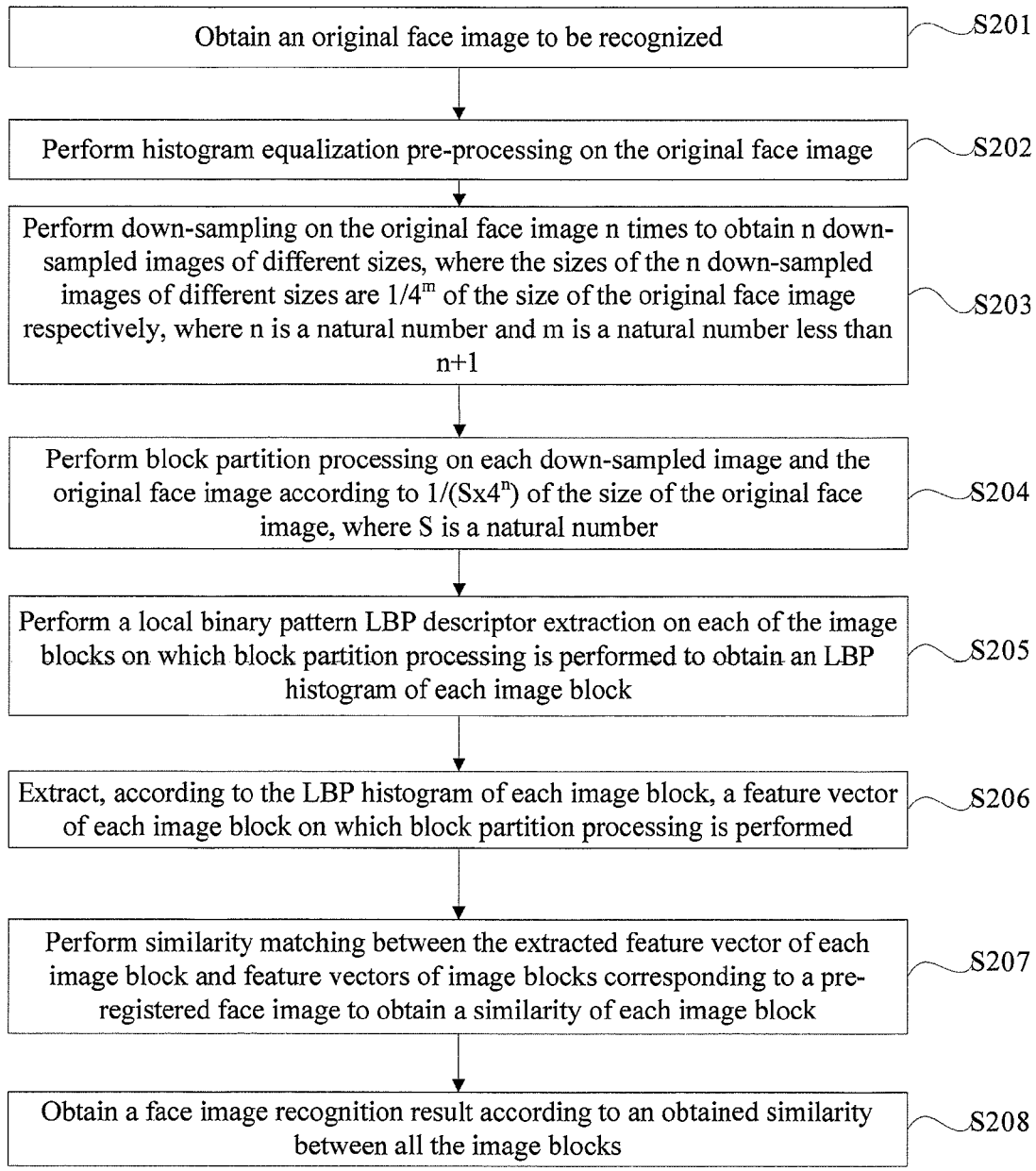
FIG. 2 is a flowchart of another embodiment of a face recognition method according to the present invention.

FIG. 2 is a flowchart of another embodiment of a face recognition method according to the present invention. As shown in FIG. 2, all steps in the following method embodiment may be specifically executed by various devices with a face recognition function, for example, a mobile phone, a personal computer, a PAD, an access control device, and the like. The method may include:

S201. Obtain an original face image to be recognized.

S202. Perform histogram equalization pre-processing on the original face image.

Specifically, the histogram equalization is a method for image enhancement and is used to enhance luminance and contrast of an image, improve the image quality, increase a sense of hierarchy of key parts of the image, and improve an effect of image interpretation and recognition.

S203. Perform down-sampling on the original face image n times to obtain n down-sampled images of different sizes, where the sizes of the n down-sampled images of different sizes are $1/4^m$ of the size of the original face image respectively; n is a natural number and m is a natural number less than n+1.

Specifically, the image down-sampling is a technology of reducing resolution of an image to display, store and/or transmit the image. In this embodiment, various existing down-sampling methods may be used, for example, such interpolation methods as a nearest neighbor interpolation, and a bilinear interpolation, to perform down-sampling on the original face image n (n=1, 2, 3, . . . ) times; and n down-sampled images whose sizes are $1/4, 1/4^2, \ldots, 1/4^n$ of the size of the original face image respectively are obtained. Using n=2 as an example, assuming the size of the original face image is W×H and down-sampling is performed on the original face image twice to obtain two down-sampled images of a smaller size, the sizes of the two down-sampled images are ¼ and 1/16 of the size of the original face image respectively, that is, their sizes are (W/2)×(H/2) and (W/4)×(H/4) respectively.

S204. Perform block partition processing on each down-sampled image and the original face image according to $1/(S \times 4^n)$ of the size of the original face image, where S is a natural number.

Specifically, block partition processing may be performed on the down-sampled images and the original face image according to ¼n, 1/(2×4n), 1/(3×4n), ..., of the size of the original face image, that is, a size of a down-sampled image of a smallest size obtained in step S203 or a smaller size than the size of the down-sampled image of the smallest size. Using n=2 and S=1 as an example, assuming the size of the original face image is W×H, block partition processing is performed on the two down-sampled images obtained in step S203 and the original face image according to $\frac{1}{4^2}$ of the size of the original face image, that is, the size of the down-sampled image of the smallest size (W/4)×(H/4), and 21 (=1+4+16) image blocks are obtained after block partition processing is performed.

S205. Perform local binary pattern LBP descriptor extraction on each image block on which block partition processing is performed to obtain an LBP histogram of each image block.

S206. Extract, according to the LBP histogram of each image block, a feature vector of each image block on which block partition processing is performed.

Figure 3:
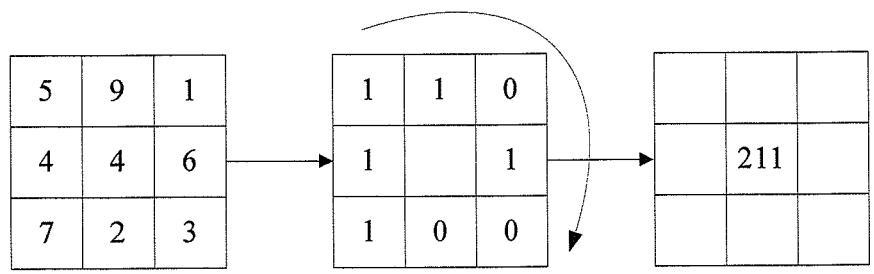
FIG. 3 is a schematic diagram showing a local binary pattern LBP descriptor extraction process.

Specifically, FIG. 3 is a schematic diagram showing a local binary pattern LBP descriptor extraction process. As shown in FIG. 3, several (for example, eight) neighborhood pixels are selected around each pixel in an image block, a gray value (4) of a center pixel is used as a reference; adjacent pixels with gray values less than a gray value of an intermediate pixel are quantized to 0, and adjacent pixels with gray values greater than or equal to the gray value of the intermediate pixel are quantized to 1; then, quantized values of the neighborhood pixels are connected in serial according to a specific direction (for example, in a clockwise direction) to obtain an 8-bit binary number (11010011); the 8-bit binary number is further converted into a decimal number (211) and the decimal number is assigned to the center pixel; the foregoing operations are performed on all pixels in the image block in sequence to obtain an LBP diagram of the image block, and each pixel in the diagram corresponds to one decimal number (0 to 255). Then, the LBP descriptor extraction process of the image block is completed.

An LBP histogram of the image block is further obtained according to the foregoing obtained LBP diagram, where the horizontal coordinate in the LBP histogram describes integers ranging from 0 to 255 and the vertical coordinate describes the number of pixels corresponding to decimal number of the horizontal coordinate in the LBP diagram. Feature vectors $(X_1, Y_1), (X_2, Y_2), \ldots, (X_{255}, Y_{255})$ of the image block are extracted according to the LBP histogram, where $X_1$ to $X_{255}$ are values of the horizontal coordinate in the LBP histogram and $Y_1$ to $Y_{255}$ are values of the vertical coordinate corresponding to the horizontal coordinate in the LBP histogram. Feature vectors of 21 image blocks on which block partition processing is performed are extracted respectively according to the foregoing method.

S207. Perform similarity matching between the extracted feature vector of each image block and feature vectors of image blocks corresponding to a pre-registered face image to obtain a similarity of each image block.

Specifically, the pre-registered face image is also obtained and stored according to the foregoing steps. In the example described in S204, n=2, S=1, and the original face image and images obtained after down-sampling is performed twice are partitioned into 21 image blocks. In this case, the pre-registered face image also corresponds to 21 image blocks, and each image block corresponds to a group of feature vectors.

A similarity between feature vectors of the 21 image blocks of the face image to be recognized obtained in step S206 and the feature vectors of the image blocks corresponding to the pre-registered face image may be matched to obtain the similarity of each image block in the face image to be recognized.

S208. Obtain a face image recognition result according to an obtained similarity between all the image blocks.

In this step, a weighted fusion computation may be performed on the obtained similarity between all the image blocks to obtain a final similarity, and the face image recognition result is obtained according to the final similarity. Specifically, weighted fusion is performed on the similarity of each image block in the face image to be recognized obtained in step S207, that is, a weight is allocated to each image block, products of the similarity of each image block and the corresponding weight are added to obtain a final similarity between the face image to be recognized and the pre-registered face image. The allocating a weight may be specifically allocating a larger weight to an image block where a key face part (for example, eye, nose, mouth, or the like) is located and allocating a smaller weight to an image block where a non-key face part (for example, cheek or the like) is located, and a sum of weights corresponding to all the image blocks is 1.

It may be determined according to whether the obtained final similarity exceeds a preset threshold whether the face image to be recognized and the pre-registered face image correspond to a same person, so as to implement recognition of the identity of the person.

Optionally, before step S207, the method may further include: performing post-processing (for example, principle component analysis and linear discriminant analysis) on the extracted feature of each image block to reduce a dimension of the feature of each image block and enhance discrimination in subsequent similarity matching.

It should be noted that the face recognition method provided in this embodiment is also applicable to recognition of images based on other biological features (for example, fingerprint, iris, palm print, and the like).

According to the face recognition method provided in this embodiment, pre-processing is performed on an original face image to be recognized, which increases an effect of image interpretation and recognition; down-sampling is performed on the original face image to obtain a down-sampled image whose size is different from a size of the original face image, and features of face images of multiple sizes are extracted, which increases a capability of the face image features to describe the face image; block partition processing is performed on the down-sampled image and the pre-processed original face image, and a face image recognition result is obtained according to a similarity between all the image blocks obtained after block partition processing is performed, which increases an accuracy of face image recognition.

Figure 4:
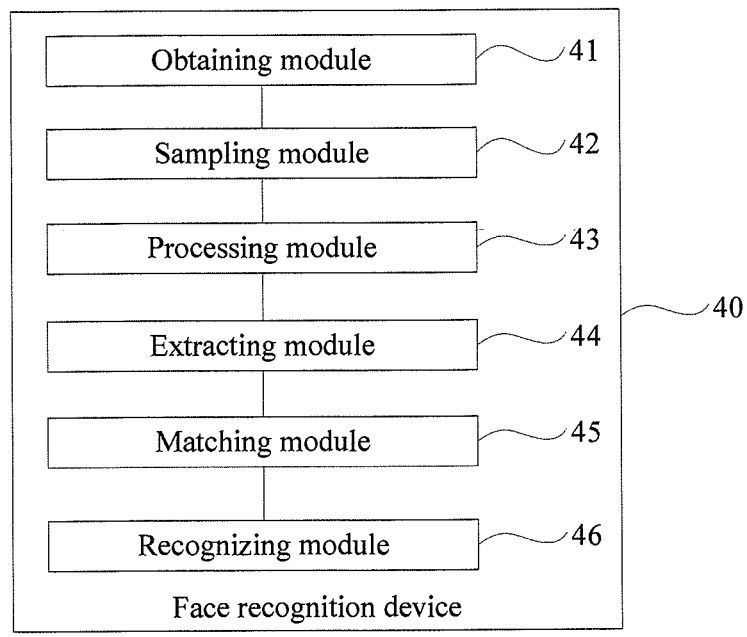
FIG. 4 is a schematic structural diagram of an embodiment of a face recognition device according to the present invention.

FIG. 4 is a schematic structural diagram of an embodiment of a face recognition device according to the present invention. As shown in FIG. 4, the face recognition device 40 provided in this embodiment is a specific subject that executes the foregoing face recognition method, which may specifically include an obtaining module 41, a sampling module 42, a processing module 43, an extracting module 44, a matching module 45, and a recognizing module 46.

The obtaining module 41 is configured to obtain an original face image to be recognized.

The sampling module 42 is configured to perform down-sampling on the original face image to obtain at least one down-sampled image whose size is different from a size of the original face image; and may be specifically configured to perform down-sampling on the original face image n times to obtain n down-sampled images of different sizes, where sizes of the n down-sampled images of different sizes are $1/4^m$ of the size of the original face image respectively; n is a natural number and m is a natural number less than n+1.

Specifically, the image down-sampling is a technology of reducing resolution of an image to display, store and/or transmit the image. In this embodiment, the sampling module 42 may use various existing down-sampling methods, for example, such interpolation methods as a nearest neighbor interpolation and a bilinear interpolation, to perform down-sampling on the original face image obtained by the obtaining module 41 n (n=1, 2, 3, times, and obtain n down-sampled images whose sizes are $1/4$, $1/4^2$, ..., $1/4^n$ of the size of the original face image respectively. Using n=2 as an example, assuming the size of the original face image is W×H and the sampling module 42 performs down-sampling on the original face image twice to obtain two down-sampled images of a smaller size, the sizes of the two down-sampled images are $1/4$ and $1/16$ of the size of the original face image respectively, that is, their sizes are (W/2)×(H/2) and (W/4)×(H/4) respectively.

The processing module 43 is configured to perform block partition processing on each down-sampled image and the original face image to obtain at least two image blocks on which block partition processing is performed; and may be specifically configured to perform block partition processing on each down-sampled image and the original face image according to $1/(S \times 4^n)$ of the size of the original face image to obtain the at least two image blocks on which block partition processing is performed, where S is a natural number.

Specifically, the processing module 43 can perform block partition processing on the down-sampled images and the original face image according to $1/4^n$, $1/(2 \times 4^n)$, $1/(3 \times 4^n)$, ..., of the size of the original face image, that is, a size of a down-sampled image of a smallest size obtained by the sampling module 42 through down-sampling or a smaller size than the size of the down-sampled image of the smallest size. Using n=2 and S=1 as an example, assuming the size of the original face image is W×H, the processing module 43 performs, according to $1/4^2$ of the size of the original face image, that is, the size of the down-sampled image of the smallest size (W/4)×(H/4), block partition processing on the two down-sampled images obtained by the sampling module 42 through down-sampling and the original face image, and obtains 21 (=1+4+16) image blocks after performing the block partition processing.

The extracting module 44 is configured to extract features of the image blocks on which block partition processing is performed to obtain features of the image blocks; and may be specifically configured to perform local binary pattern LBP descriptor extraction on each image block on which block partition processing is performed to obtain an LBP histogram of each image block; and extract, according to the LBP histogram of each image block, a feature vector of each image block on which block partition processing is performed.

Specifically, the extracting module 44 performs LBP descriptor extraction on each image block obtained after block partition processing is performed to obtain an LBP diagram of each image block, further obtain the LBP histogram of each image block according to the obtained LBP diagram, and extracts a feature vector of each image block according to the obtained LBP histogram. For details about the specific process, reference may be made to the related descriptions in step S206 in the embodiment shown in FIG. 2, which is not further described herein.

The matching module 45 is configured to perform similarity matching between the extracted feature of each image block and features of image blocks corresponding to a pre-registered face image to obtain a similarity of each image block.

Specifically, the pre-registered face image is also obtained and stored according to the foregoing solution. Using n=2 and S=1 as an example, the original face image is partitioned into 16 image blocks, and images obtained after down-sampling is performed twice are partitioned into four image blocks and one image block respectively. In this case, the pre-registered face image also corresponds to 21 image blocks, and each image block corresponds to a group of feature vectors.

The matching module 45 performs similarity matching between feature vectors of the 21 image blocks of the face image to be recognized extracted by the extracting module 44 and the feature vectors of the image blocks corresponding to the pre-registered face image to obtain the similarity of each image block in the face image to be recognized.

The recognizing module 46 is configured to obtain a face image recognition result according to an obtained similarity between all the image blocks.

The recognizing module 46 may perform a weighted fusion computation on the obtained similarity between all the image blocks to obtain a final similarity, and obtain the face image recognition result according to the final similarity. Specifically, the recognizing module 46 performs weighted fusion on the similarity of each image block in the face image to be recognized obtained by the matching module 45, that is, allocate a weight to each image block, and add products of the similarity of each image block and the corresponding weight to obtain a final similarity between the face image to be recognized and the pre-registered face image. The allocating a weight may be specifically allocating a larger weight to an image block where a key face part (for example, eye, nose, mouth, or the like) is located and allocating a smaller weight to an image block where a non-key face part (for example, cheek or the like) is located, and a sum of weights corresponding to all the image blocks is 1.

The recognizing module 46 determines according to whether the obtained final similarity exceeds a preset threshold whether the face image to be recognized and the pre-registered face image correspond to a same person, so as to implement recognition of the identity of the person.

Optionally, the sampling module 42 may be further configured to perform histogram equalization processing on the original face image before performing down-sampling on the original face image.

Specifically, the histogram equalization is a method for image enhancement and is used to enhance luminance and contrast of an image, improve the image quality, increase a sense of hierarchy of key parts of the image, and improve an effect of image interpretation and recognition.

Optionally, the matching module 45 may be further configured to: before performing similarity matching between the extracted feature of each image block and the features of image blocks corresponding to the pre-registered face image, perform post-processing (for example, principle component analysis and linear discriminant analysis) on the feature of each image block extracted by the extracting module 44 to reduce a dimension of the feature of each image block and enhance discrimination in subsequent similarity matching.

It should be noted that the face recognition device 40 provided in this embodiment is also applicable to recognition of images based on other biological features (for example, fingerprint, iris, palm print, and the like).

According to the face recognition device provided in this embodiment, pre-processing is performed on an original face image to be recognized, which increases an effect of image interpretation and recognition; down-sampling is performed on the original face image to obtain a down-sampled image whose size is different from a size of the original face image, and features of face images of multiple sizes are extracted, which increases a capability of the face image features to describe the face image; block partition processing is performed on the down-sampled image and the pre-processed original face image, and a face image recognition result is obtained according to a similarity between all the image blocks obtained after block partition processing is performed, which increases an accuracy of face image recognition.

Figure 5:
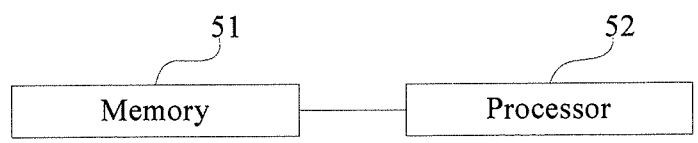
FIG. 5 is a schematic structural diagram of another embodiment of a face recognition device according to the present invention.

FIG. 5 is a schematic structural diagram of another embodiment of a face recognition device according to the present invention. As shown in FIG. 5, the face recognition device provided in this embodiment includes a memory 51 and a processor 52. Optionally, the face recognition device may further include modules like a camera to obtain an original face image. The memory 51 may include a high speed RAM memory, and may also include a non-volatile memory (non-volatile memory), for example, at least one disk memory. Optionally, the memory 51 may include at least one storage apparatus. The memory 51 stores an execution instruction. When the face recognition device runs, the processor 52 communicates with the memory 51, and the processor 52 executes the instruction to enable the face recognition device to execute the face recognition method provided in any embodiment in FIG. 1 or FIG. 2.

The processor provided in this embodiment may be an integrated circuit chip and has a signal processing capability. During the implementation, all steps of the foregoing method may be completed by an integrated logic circuit of hardware or instructions in software forms in the processor. The foregoing processor may be a general processor, a digital signal processor (DSP), an application specific integrated circuit (ASIC), a field programmable gate array (FPGA) or other programmable logical device, a discrete gate or a transistor logical device, and a discrete hardware component, and can implement or execute methods, steps, or logical frameworks disclosed in the embodiments of the present invention. The foregoing processor may be a microprocessor or the processor may be any conventional processor and the like. Steps of the method disclosed with reference to the embodiment of the present invention may be directly executed by a hardware processor or by a combination of hardware and software modules in the processor. The software module may be located in a mature storage medium in the art, such as a random memory, a flash memory, a read-only memory, a programmable read-only memory, an electrically erasable programmable memory, or a register. The storage medium is located in the memory. The processor reads information in the memory, and executes the steps of the foregoing method in combination with hardware of the processor.

An embodiment of the present invention further provides a chip, where the chip is configured to perform face recognition processing and the chip may include the foregoing processor.

It should be noted that the face recognition device provided in this embodiment is also applicable to recognition of images based on other biological features (for example, fingerprint, iris, palm print, and the like).

According to the face recognition device provided in this embodiment, a processor 52 executes an instruction stored in a memory to perform pre-processing on an original face image to be recognized, which increases an effect of image interpretation and recognition, perform down-sampling on the original face image to obtain a down-sampled image whose size is different from a size of the original face image, extract features of face images of multiple sizes, which increases a capability of the face image features to describe the face image; perform block partition processing on the down-sampled image and the pre-processed original face image, and obtain a face image recognition result according to a similarity between all the image blocks obtained after block partition processing is performed, which increases an accuracy of face image recognition.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solution to depart from the scope of the technical solutions of the embodiments of the present invention.

What is claimed is:

1. A face recognition method, comprising:
obtaining an original face image to be recognized;
performing down-sampling on the original face image to obtain at least one down-sampled image whose size is different from a size of the original face image;
performing block partition processing on each down-sampled image and the original face image to obtain at least two image blocks on which block partition processing is performed;
extracting features of the image blocks on which block partition processing is performed to obtain features of the image blocks;
wherein extracting features of the image blocks on which block partition processing is performed to obtain features of the image blocks comprises:
performing local binary pattern (LBP) descriptor extraction on each image block on which block partition processing is performed to obtain an LBP histogram of each image block; and
extracting, according to the LBP histogram of each image block, a feature vector of each image block on which block partition processing is performed;
performing similarity matching between the feature of each image block and features of image blocks corresponding to a pre-registered face image to obtain a similarity of each image block; and
obtaining a face image recognition result according to an obtained similarity between all the image blocks.

2. The method according to claim 1, wherein performing down-sampling on the original face image to obtain at least one down-sampled image whose size is different from a size of the original face image comprises:

performing down-sampling on the original face image n times to obtain n down-sampled images of different sizes, wherein the sizes of the n down-sampled images of different sizes are ¼ m of the size of the original face image respectively; n is a natural number and m is a natural number less than n+1.

3. The method according to claim 2, wherein performing block partition processing on each down-sampled image and the original face image comprises:

performing block partition processing on each down-sampled image and the original face image according to 1/(S×4 n) of the size of the original face image, wherein S is a natural number.

4. The method according to claim 3, wherein S is equal to 1 and n is equal to 2.

5. The method according to claim 1, wherein before performing down-sampling on the original face image, the method further comprises:

performing histogram equalization pre-processing on the original face image.

6. A face recognition device, comprising:
a processor; and
a non-transitory computer-readable storage medium coupled to the processor and storing programming instructions for execution by the processor, the instructions instruct the processor to:
obtain an original face image to be recognized;
perform down-sampling on the original face image to obtain at least one down-sampled image whose size is different from a size of the original face image;
perform block partition processing on each down-sampled image and the original face image to obtain at least two image blocks on which block partition processing is performed;
perform local binary pattern (LBP) descriptor extraction on each image block on which block partition processing is performed to obtain an LBP histogram of each image block;
extract, according to the LBP histogram of each image block, a feature vector of each image block on which block partition processing is performed;
perform similarity matching between the feature of each image block and features of image blocks corresponding to a pre-registered face image to obtain a similarity of each image block; and
obtain a face image recognition result according to an obtained similarity between all the image blocks.

7. The device according to claim 6, wherein the instructions instruct the processor to:

perform down-sampling on the original face image n times to obtain n down-sampled images of different sizes, wherein the sizes of the n down-sampled images of different sizes are ¼ m of the size of the original face image respectively; n is a natural number and m is a natural number less than n+1.

8. The device according to claim 7, wherein the instructions instruct the processor to:

perform block partition processing on each down-sampled image and the original face image according to 1/(S×4 n) of the size of the original face image, wherein S is a natural number.

9. The device according to claim 8, wherein S is equal to 1 and n is equal to 2.

10. The device according to claim 6, wherein the instructions further instruct the processor to:

perform histogram equalization processing on the original face image before performing down-sampling on the original face image.

* * * * *